Figure 1:
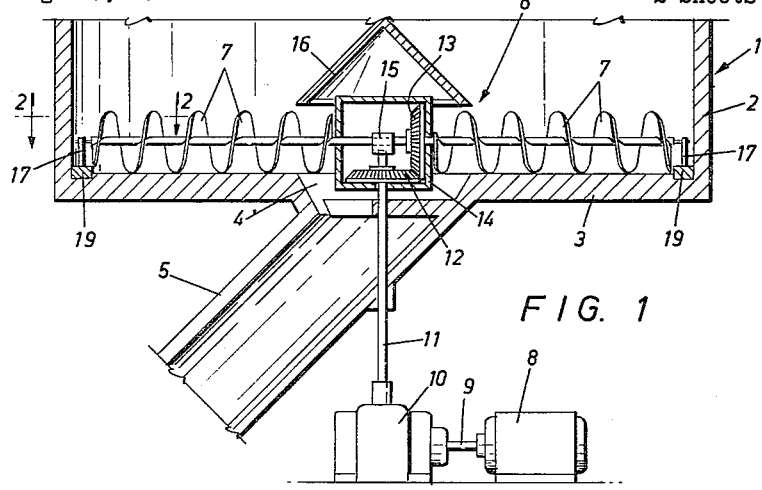

Inventor
FREDERICK H. HUMPHREY
by:
Attorney

Aug. 21, 1962     F. H. HUMPHREY     3,050,201
APPARATUS FOR UNLOADING MATERIALS FROM CONTAINERS
Filed Aug. 29, 1960     2 Sheets-Sheet 2

Inventor
FREDERICK H. HUMPHREY
by: *[signature]*
Attorney

United States Patent Office 3,050,201
Patented Aug. 21, 1962

3,050,201
APPARATUS FOR UNLOADING MATERIALS FROM CONTAINERS
Frederick H. Humphrey, Markham, Ontario, Canada
Filed Aug. 29, 1960, Ser. No. 52,707
1 Claim. (Cl. 214—17)

This invention relates to apparatus suitable for use in connection with facilitating the unloading of materials from containers wherein the materials are stored. More particularly, this invention relates to unloading apparatus which is particularly useful for facilitating the unloading from containers of materials which will not flow by gravity.

Many materials such as, for example, flour, apple pulp and tanbark, to name only a few, are stored in containers and tanks and because of their high viscosity or because they pack into lumps, will not flow, at least appreciably, from the container by means of gravity. This, of course, poses no particular problem if the container is to be loaded from the top and the material can be scooped out of or otherwise removed from the container from the top thereof. However, some materials, such as, for example, flour, must be taken from the storage container on a first-in, first-out basis. The flour is loaded into the tank or container from the top, and hence must be removed from the bottom in order to satisfy the aforementioned requirement. Moreover, it must be removed uniformly from the entire bottom surface of the container.

Unloaders which are presently in use and which permit unloading of a container from the bottom thereof are complicated mechanisms which not only are expensive but also require costly maintenance. Further, such unloaders are difficult to clean. Where such unloaders are employed to unload foodstuffs, for example, from a container, it is very important that they be kept clean at all times.

Accordingly, it is an important object of my invention to provide a simple apparatus useful in facilitating the unloading of materials from the bottom of a container.

It is another object of my invention to provide such an apparatus which may be readily manufactured at a low cost.

It is a further object of my invention to provide such an apparatus which requires little or no maintenance.

Still another object of my invention is to provide such an apparatus which is at least partially self cleaning, and which is readily accessible for cleaning, if such is necessary.

In brief, in order to unload materials from a container through an opening in the bottom thereof, and in accordance with my invention, I provide unloading means which comprises a conveyor screw positioned inside the container adjacent the bottom thereof, the conveyor screw having one end thereof adjacent the opening and the other end thereof positioned adjacent a side wall of the container. Means are provided for mounting the conveyor screw in the container to permit rotation thereof in a plane at least substantially parallel to the bottom of the container. Means also are provided for rotating the conveyor screw about its longitudinal axis in a direction to cause the material in the container to be drawn towards the opening.

Figure 2:
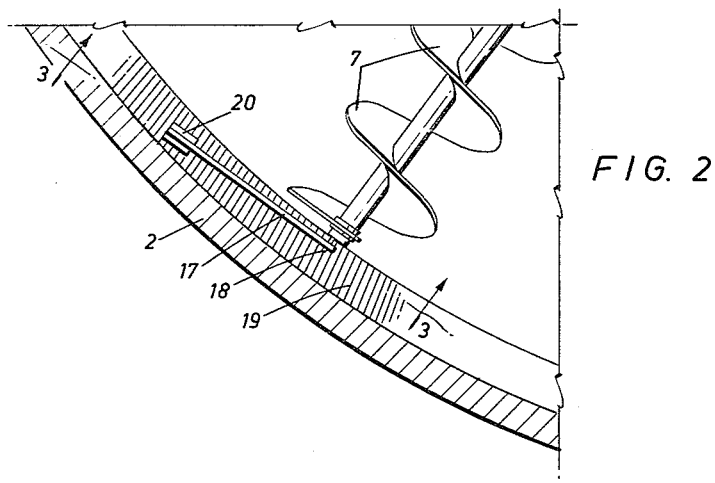
Figure 3:
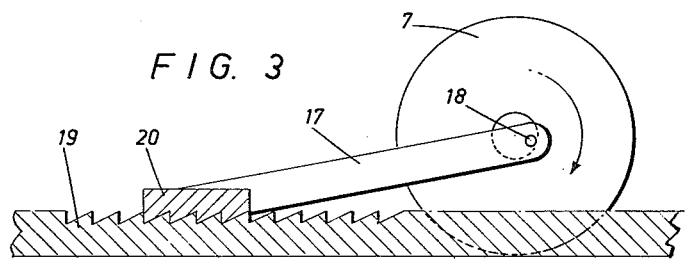
Figure 5:
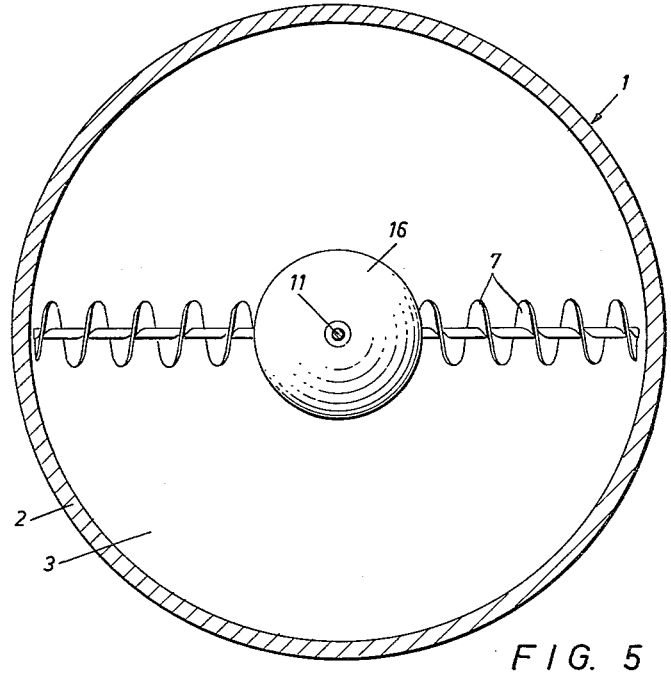
Figure 4:
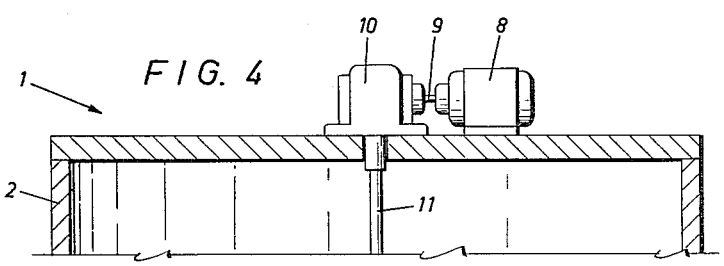
Figure 4:
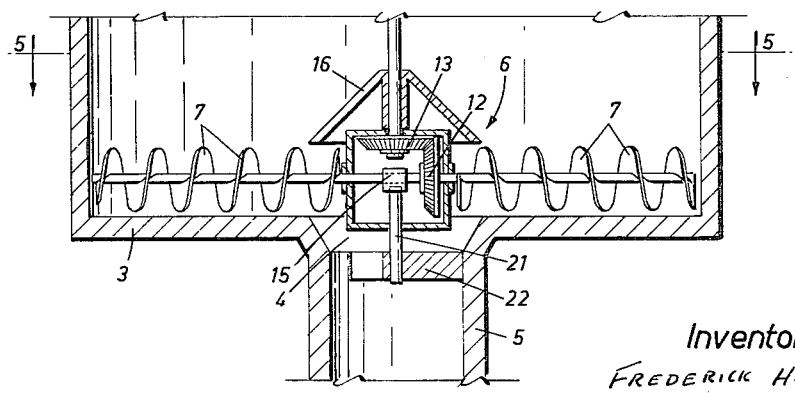

Other objects and advantages of apparatus embodying my invention will become apparent from the following detailed description taken in conjunction with the drawings in which:

FIGURE 1 schematically represents, partially in section, the bottom portion of a container for storing materials, apparatus embodying my invention being shown therein, FIGURE 2 is a section taken along line 2—2 in FIGURE 1, FIGURE 3 is a section taken along line 3—3 in FIGURE 2, FIGURE 4 illustrates, partially in section, a part of a container including apparatus embodying my invention and, FIGURE 5 is a section taken along line 5—5 in FIGURE 4.

Referring to the drawings, and in particular to FIGURES 1 to 3 inclusive, for a more detailed description of apparatus embodying my invention, I have shown a container 1 which is cylindrical in shape and has a side wall 2 and a bottom 3. An opening 4 is centrally disposed in bottom 3 and opens into a chute 5. As will become more apparent hereafter, material stored in container 1 is, in accordance with my invention, drawn to opening 4 and falls out therethrough into chute 5 so as to accomplish unloading of the material stored in container 1.

In accordance with my invention, I provide unloading means generally designated at 6 to facilitate the unloading of materials from container 1. Unloading means 6 comprises a pair of oppositely extending conveyor screws 7. While in the embodiment of my invention illustrated in FIGURE 1, I have shown a pair of conveyor screws 7, it will be appreciated that it would not depart from my invention to use a single conveyor screw or to use more than two conveyor screws.

Means are provided for rotating conveyor screws 7 about their longitudinal axes. These means include a motor 8 connected by a shaft 9 to a speed reducing gearbox 10. The vertical shaft 11 of speed reducing gearbox 10 is driven through speed reducing gearbox 10 at a lower speed than that of shaft 9 and imparts rotation to conveyor screws 7 about their longitudinal axes through a pair of meshing gears 12 and 13 located in a housing 14. Gear 12 is fixed to shaft 11, while gear 13 is fixed to conveyor screw 7. The conveyor screws are adapted to be rotated through the aforementioned apparatus in a direction to cause material in container 1 to be drawn towards opening 4.

As may be seen from the drawings, conveyor screws 7 each have an end positioned adjacent opening 4, the other ends of the conveyor screws being positioned adjacent side wall 2 of container 1. Conveyor screws 7 are mounted in container 1 in a bearing 15 rotatably mounted at one end of shaft 11. This bearing permits rotation of conveyor screws 7 in a plane which is parallel to bottom 3 of container 1. As will also be seen from the drawings, conveyor screws 7 just clear the inside surface of bottom 3.

In order to prevent materials such as grain stored in container 1 from falling directly through the container and out opening 4, a shield 16 is placed over and above the opening. This shield or deflector cone projects far enough to prevent a substantial amount of material from escaping out through opening 4 directly and is designed bearing in mind the normal angle of repose of the material to be stored in container 1.

In accordance with my invention means may be provided for rotating conveyor screws 7 in a plane which is at least substantially parallel to bottom 3. These means comprises a dog or elongated inclined link member 17 eccentrically mounted at 18 on conveyor screw 7, as best seen in FIGURE 3. A serrated track 19, which is circular in plan, is provided in bottom 3 around the periphery thereof. The end portion 20 of dog 17 is complementarily serrated and track 19 and dog 17 are juxtapositioned so as to effect positive, non-sliding engagement therebetween during a portion of a rotation of conveyor screw 7 about its longitudinal axis. It will be apparent from a consideration of FIGURE 3 that movement of conveyor screws 7 in a plane parallel to bottom 3 will result during rotation of conveyor screws 7 about their longitudinal axes as a result of dog 17 and track 19.

The apparatus embodying my invention shown in FIGURE 4 is the same as the apparatus shown in FIGURE 1, with the exception that no dog 17 or track 19 is provided, and motor 8 and speed reducing gearbox 10 are mounted on top of container 1 rather than below it. Thus, in the embodiment of my invention shown in FIGURE 4, conveyor screws 7 are caused to rotate about their longitudinal axes by means positioned above rather than below container 1. Rotation of conveyor screws 7 in a plane parallel to bottom 3 is permitted through bearing 15 rotatably supported in a shaft 21 which is securely fixed on its other end to a lip 22.

It will be noted that in both embodiments of my invention shown in FIGURES 1 and 4, shafts 11 and 21 respectively are mounted in such a manner that they do not obstruct access of the material in container 1 to the opening 4 which leads to unloading chute 5.

The operation of the embodiment of my invention shown in FIGURE 4 will now be discussed. It will be assumed for the purposes of this discussion that container 1 is full of material such as flour, tanbark or apple pulp. Rotation of shaft 9, driven by motor 8, causes rotation of shaft 11, which, in turn, through gears 12 and 13, causes rotation of conveyor screws 7 in a direction to cause the material to be drawn towards opening 4. Since conveyor screws 7 are embedded in the material, they are not free to swing about the vertical axis of shaft 21. The material will be continually transported to opening 4 by conveyor screws 7 and emptied from container 1 through chute 5, as long as conveyor screws 7 are supplied with material. When container 1 is almost emptied, and hence there is little resistance to rotation of conveyor screws 7 about the vertical axis of shaft 21, conveyor screws 7 will rotate about this axis until material is encountered which causes the swinging action to stop. In this new position the screws 7 will continue to unload material from container 1 by drawing it towards opening 4. This process is continued until all of the contents of the cylindrical container are removed.

On the other hand, if the material in container 1 is very viscous or sticky or packed solidly so that it does not drop into the path of conveyor screws 7, the torque produced by the vertical drive shaft 11 will cause conveyor screws 7 to rotate about the vertical axis of shaft 21. In this manner conveyor screws 7 engage fresh material, and the drag on the conveyor screws as a result of this engagement increases the torque about vertical shaft 11 and causes the conveyor screws 7 to bite deeper into the material. At the same time, of course, this fresh material is being drawn towards opening 4 by conveyor screws 7. It will be apparent that this process will continue and conveyor screws 7 will completely undermine viscous or solidly packed materials, the undermined portion of the materials falling in behind the conveyor screws and being fed by them to opening 4 after conveyor screws 7 have made a complete rotation on a plane parallel to bottom 3. Thus it will be apparent that even viscous or solidly packed materials may be completely removed from a container in accordance with my invention.

The embodiment of my invention illustrated in FIGURES 1 to 3 inclusive operates in the same manner as the embodiment just discussed except that dog 17 and track 19 are provided for positive rotation of conveyor screws 7 in a plane parallel to bottom 3. In this regard, it will be apparent from a consideration of FIGURE 3 that during a portion of a complete rotation of conveyor screws 7 about their longitudinal axes, a forward force will be exerted on conveyor screws 7 through dog 17, and this force will push conveyor screws 7 in a forward direction, thereby providing positive assistance in the rotation of conveyor screws 7 about the vertical axis of shaft 11.

While I have discussed certain preferred embodiments of my invention, it will be apparent that various modifications and changes may be made therein without departing from the spirit and scope of my invention as defined in the appended claim.

What I claim as my invention is:

In a cylindrical container adapted to receive materials to be unloaded from said container through a central opening in the bottom thereof, a pair of oppositely extending and laterally disposed conveyor screws positioned inside said container adjacent the bottom thereof, said screws extending substantially across the entire width of said bottom, said screws integrally formed on a horizontal shaft for rotation therewith, said conveyor screws having their inner ends positioned adjacent and over said opening and in spaced relationship with each other and their outer ends disposed adjacent the inner surface of said container, a vertical drive shaft extending from below said bottom upwardly through said opening and above said bottom, bearing means on the upper end of said vertical shaft for supporting said horizontal shaft, a first bevel gear fixed on said vertical shaft within said container, a second bevel gear fixed on said horizontal shaft, said gears positioned to engage each other so said screws are rotated about their longitudinal axis to cause said material to be drawn inwardly towards said central opening, elongated inclined link members eccentrically pivotally mounted on said outer ends of said horizontal shaft and connected thereto for movement thereby, the outer ends of said link members comprising a free end consisting of a rectangular block having a plurality of downwardly facing serrations on the bottom thereof, a circular track secured to said bottom adjacent said inner surface of said container and partially disposed in an annular recess in said bottom, complementary upwardly facing serrations in the top of said track adapted to receive said block serrations, said block serrations being disposed to engage said track serrations by gravity to cause rotation of said conveyor screws in a plane substantially parallel to the bottom of said container, and means for rotating said vertical shaft whereby said screws rotate about said horizontal shaft and also rotatably sweep the bottom of said container to remove material through said opening.

References Cited in the file of this patent

UNITED STATES PATENTS

| | | |
|---|---|---|
| 1,274,547 | Holnagel et al. | Aug. 6, 1918 |
| 1,275,558 | Holmgreen | Aug. 13, 1918 |